(12) United States Patent
Shirakawa et al.

(10) Patent No.: US 9,769,039 B2
(45) Date of Patent: Sep. 19, 2017

(54) COMMUNICATION VISUALIZATION DEVICE

(71) Applicant: Hitachi Metals, Ltd., Minato-ku, Tokyo (JP)

(72) Inventors: Yohei Shirakawa, Hitachi (JP); Koki Hirano, Hitachinaka (JP); Takumi Kobayashi, Hitachi (JP); Yoshitake Ageishi, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 260 days.

(21) Appl. No.: 14/816,451

(22) Filed: Aug. 3, 2015

(65) Prior Publication Data

US 2016/0035211 A1 Feb. 4, 2016

(30) Foreign Application Priority Data

Aug. 4, 2014 (JP) .................. 2014-158738

(51) Int. Cl.
*G08B 21/18* (2006.01)
*H04L 12/26* (2006.01)

(52) U.S. Cl.
CPC ........ *H04L 43/0811* (2013.01); *H04L 43/045* (2013.01)

(58) Field of Classification Search
CPC ... H04B 3/00; H04B 3/52; H04B 3/54; H04B 3/548; H04B 3/56; H04B 2203/5429; H04B 2203/5437; H04B 2203/5441; H04B 2203/5445; H04B 2203/545; H04B 2203/5454; H04B 2203/5462; H04B 2203/5483; H04B 2203/5487; H04B 2203/5491; H04L 43/00; H04L 43/04; H04L 43/045; H04L 43/08; H04L 43/0811; H04L 43/0817; H04L 43/0847
See application file for complete search history.

(56) References Cited

U.S. PATENT DOCUMENTS

| 5,473,244 | A | * | 12/1995 | Libove | .................. | G01R 1/22 |
| | | | | | | 324/126 |
| 5,757,265 | A | * | 5/1998 | Kogure | ............. | H04L 12/40006 |
| | | | | | | 324/539 |
| 7,019,658 | B1 | * | 3/2006 | Erickson | .............. | H01R 13/641 |
| | | | | | | 340/635 |
| 2004/0227580 | A1 | * | 11/2004 | Otsuka | .................. | H01P 3/02 |
| | | | | | | 333/4 |
| 2010/0120264 | A1 | | 5/2010 | Caveney et al. | | |

FOREIGN PATENT DOCUMENTS

JP 2012-508956 A 4/2012

* cited by examiner

*Primary Examiner* — Van Trieu
(74) *Attorney, Agent, or Firm* — Crowell & Moring LLP

(57) ABSTRACT

A communication visualization device includes a transformer for converting a magnetic field caused from a LAN cable connected to an information communication apparatus into electric energy at time of information communication, an amplifier circuit for amplifying the electric energy output from the transformer, a rectifier circuit for converting an amplified signal amplified by the amplifier circuit into a DC voltage, and a light-emitting circuit for emitting light when the DC voltage obtained by conversion of the rectifier circuit is supplied thereto.

8 Claims, 10 Drawing Sheets

COMMUNICATION VISUALIZATION DEVICE

CROSS-REFERENCE TO RELATED APPLICATION

The present application claims priority from Japanese Patent Application No. 2014-158738 filed on Aug. 4, 2014, the content of which is hereby incorporated by reference into this application.

TECHNICAL FIELD

The present invention relates to a communication visualization system, and in particular, to a technology of visualizing an existence or nonexistence of communication through a communication cable.

BACKGROUND

In a data center or the like, connections of communication cables, such as local area network (LAN) cables, are changed due to layout change, movement, or extension of an information communication apparatus, such as a server or a hub.

There is an information communication apparatus including a lamp for connection check which enables a connection of the communication cable to be checked. The lamp is installed in, for example, a connector or the like which connects communication cables mounted on the information communication apparatus.

The lamp is turned on when the communication cable is connected to the connector and communication is established between information communication apparatuses. When the communication cable is separated from the connector of the information communication apparatus, the lamp is turned off.

In addition, there is another information communication apparatus in which a lamp for connection check is installed in a connector portion of a communication cable side. Similarly, when the communication cable is connected to a connector of the information communication apparatus, the lamp is turned on. When the communication cable is separated from the connector of the information communication apparatus, the lamp is turned off.

As a technology of checking connection of communication cables, there is known a technology of detecting insertion or removal of a patch cord or a plug and monitoring connection of the patch cord in an patching environment (for example, see Japanese Patent Application Laid-Open Publication (Translation of a PCT Application) No. 2012-508956).

SUMMARY

In recent years, as various services are concentrated, a network inside a data center has been complicated. For example, when an integrated information communication apparatus is wired in a distal place, it is hard to identify a removal target communication cable by using only the lamp for connection check and there is apprehended that a communication cable is incorrectly removed.

In particular, when a communication cable is incorrectly removed during data communication, it is likely that a service of the information communication apparatus is stopped and data which is being transmitted is damaged.

In addition, installation of the lamp in the connector portion of the communication cable requires an additional dedicated communication cable including a wiring which detects whether the communication cable is connected to the connector. Therefore, cost increases and a diameter and weight of the communication cable increase, resulting in reduction of workability.

In addition, it is necessary to prepare a special connector equipped with a dedicated communication cable, or the like, causing an increment in cost. In order to replace an existing communication cable with a dedicated communication cable, large-scale changing operation is performed.

The present invention provides a technology of visually checking an existence or nonexistence of information communication through a communication cable inexpensively and easily.

The above and other preferred aims and novel characteristics of the present invention will be apparent from the description of the present specification and the accompanying drawings.

The typical ones of the inventions disclosed in the present application will be briefly described as follows.

A communication visualization device according to an aspect of the present invention includes a converting part, an amplifying part, a rectifying part, and a light-emitting part. The converting part coverts a magnetic field caused from a communication cable connected to an information communication apparatus into electric energy at time of the information communication.

The amplifying part amplifies the electric energy output from the converting part. The rectifying part converts an amplified signal amplified by the amplifying part into a DC voltage. The light-emitting part emits light when the DC voltage obtained by conversion of the rectifying part is supplied thereto.

A communication visualization device according to another aspect of the present invention includes a ferrite core by which the converting part generates a magnetic field by communication of a communication cable, and a coil for outputting a voltage induced by a current caused by the magnetic field generated by the ferrite core.

In a communication visualization device according to another aspect of the present invention, the amplifying part operates with a power supply voltage supplied from the outside.

The communication visualization device according to another embodiment of the present invention further includes a first matching part for adjusting an impedance between the converting part and the amplifying part.

The communication visualization device according to another aspect of the present invention further includes a second matching part for adjusting an impedance between the amplifying part and the rectifying part.

The communication visualization device according to another aspect of the present invention is attached to the communication cable.

The communication visualization device according to another aspect of the present invention is installed in an extension adapter which connects the communication cables to achieve extension.

The communication visualization device according to another aspect of the present invention is installed in a wiring panel which concentrates a plurality of communication cables.

It is possible to visually check an existence or nonexistence of information communication transferred by a communication cable.

BRIEF DESCRIPTIONS OF THE DRAWINGS

DESCRIPTIONS OF THE PREFERRED EMBODIMENTS

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle.

Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Also, components having the same function are denoted by the same reference symbols throughout the drawings for describing the embodiments, and a repetitive description thereof is omitted.

Hereinafter, embodiments will be described in detail below.

First Embodiment

Configuration Example of Communication Visualization Device

Figure 1:
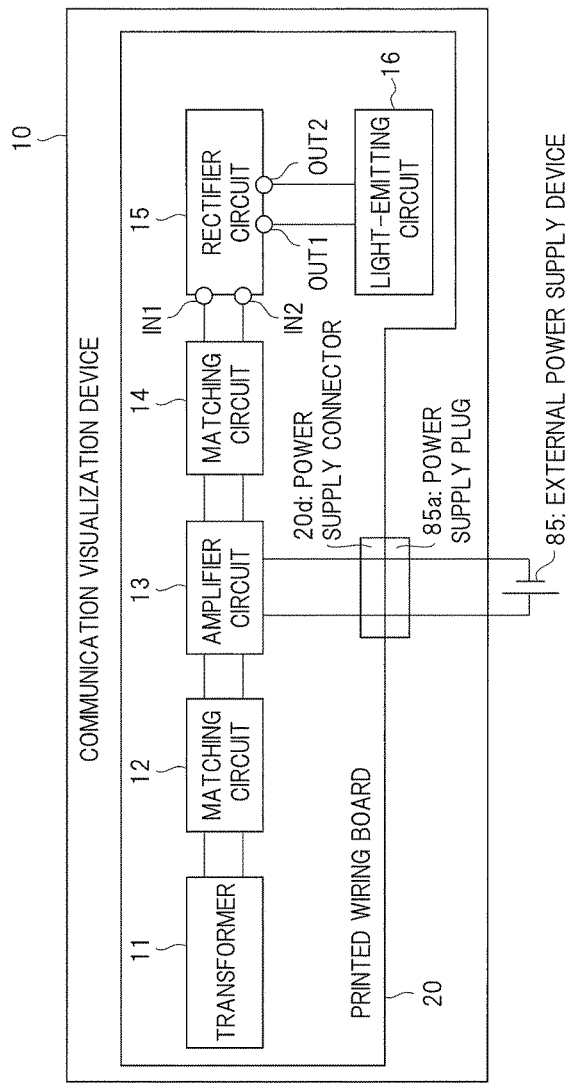
FIG. 1 is a diagram illustrating a configuration example of a communication visualization device according to a first embodiment of the present invention.

FIG. 1 is a diagram illustrating a configuration example of a communication visualization device 10 according to a first embodiment of the present invention. The communication visualization device 10 allows for visual check of an existence or nonexistence of information communication through, for example, a LAN cable 80 or the like illustrated in FIG. 11.

The LAN cable 80 is inserted into a socket of a LAN connector or the like installed in an information communication apparatus (not illustrated), such as a server installed in, for example, a data center or a hub, and is a communication cable which transfers information between information communication apparatuses connected to one another.

As illustrated in FIG. 1, the communication visualization device 10 includes a transformer 11, a matching circuit 12, an amplifier circuit 13, a matching circuit 14, a rectifier circuit 15, and a light-emitting circuit 16.

The transformer 11 that is a converting part converts a magnetic field, which is generated by a high-frequency signal leaking from the LAN cable 80 at the time of communication, into an AC electric signal.

The matching circuit 12 that is a first matching part is a circuit for optimally making impedance matching between the transformer 11 and the amplifier circuit 13. Power loss decreases by optimizing the impedance matching.

The amplifier circuit 13 that is an amplifying part amplifies the AC electric signal obtained by the conversion of the transformer 11. Power generated by, for example, an external power supply device 85 is supplied to the amplifier circuit 13 from the outside. The external power supply device 85 generates DC power from, for example, commercial power and supplies the DC power as operation power of the amplifier circuit 13.

The external power supply device 85 includes a power supply plug 85a. In addition, a power supply connector 20d is mounted on a printed wiring board 20 to be described below. An electrode part of the power supply connector 20d is connected to the amplifier circuit 13 through a wiring pattern (not illustrated) of the printed wiring board 20. The external power supply device 85 supplies the operation power to the amplifier circuit 13 by connection between the power supply plug 85a and the power supply connector 20d of the printed wiring board 20.

Therefore, it is possible to perform stable amplification operation and improve reliability of the communication visualization device 10. The amplifier circuit 13 can make amplification for low noise having a high-frequency by using, for example, a low noise amplifier (LNA).

The matching circuit 14 that is a second matching part is a circuit for optimally making impedance matching between the amplifier circuit 13 and the rectifier circuit 15. The rectifier circuit 15 that is a rectifying part rectifies an AC electric signal amplified by the amplifier circuit 13 and converts the AC electric signal into a DC voltage. The light-emitting circuit 16 that is a light-emitting part is supplied with the DC voltage output from the rectifier circuit 15 and emits light with the DC voltage.

The transformer 11, the matching circuit 12, the amplifier circuit 13, the matching circuit 14, the rectifier circuit 15, and the light-emitting circuit 16 are mounted on the printed wiring board 20. The printed wiring board 20 includes a plurality of substrates which are formed of, for example, glass-fabric-based epoxy resin or the like, and a multi-layer wiring substrate having a wiring pattern of copper or the like formed between the substrates.

Example of Matching Circuit

Figure 2:
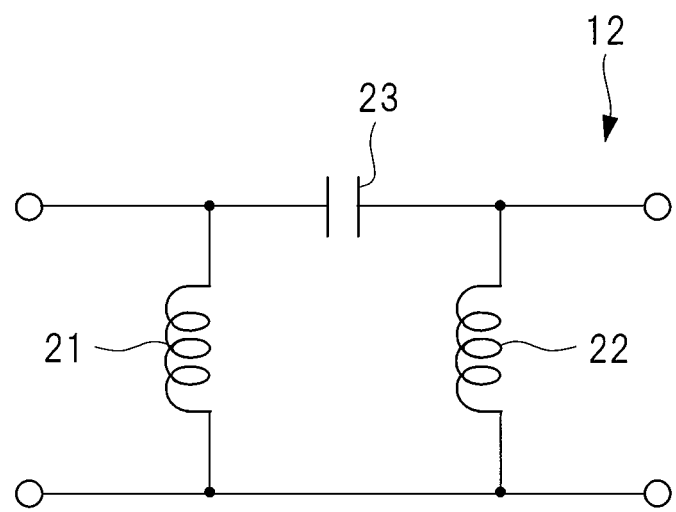
FIG. 2 is a diagram illustrating an example of a matching circuit provided in the communication visualization device of FIG. 1.

FIG. 2 is a diagram illustrating an example of the matching circuit 12 provided in the communication visualization device 10 of FIG. 1. Although a configuration of the matching circuit 12 is illustrated in FIG. 2, the matching circuit 14 also has the same configuration.

The matching circuit 12 is formed of an LC circuit including inductors 21 and 22 and a capacitor 23. One connection part of the inductor 21 and one connection part of the capacitor 23 are connected to one output part of the transformer 11 (FIG. 1). One connection part of the inductor 22 is connected to the other connection part of the capacitor 23. A connection portion between the capacitor 23 and the inductor 22 becomes one output part of the matching circuit 12 and is connected to one input part of the amplifier circuit 13 (FIG. 1).

The other connection parts of the inductors 21 and 22 are respectively connected to the other output part of the transformer 11 and the other input part of the amplifier circuit 13. The matching circuit 12 is a so-called π-type matching circuit or the like, and may use an inductor instead of a capacitor or a capacitor instead of an inductor in a matching state. Due to the matching state, the inductor 22 may be removed, that is, open termination may be achieved.

Configuration Example of Rectifier Circuit

Subsequently, the rectifier circuit 15 will be described.

FIGS. 3 to 6 are diagrams illustrating circuit configuration examples of the rectifier circuit 15 provided in the communication visualization device 10 of FIG. 1.

Figure 3:
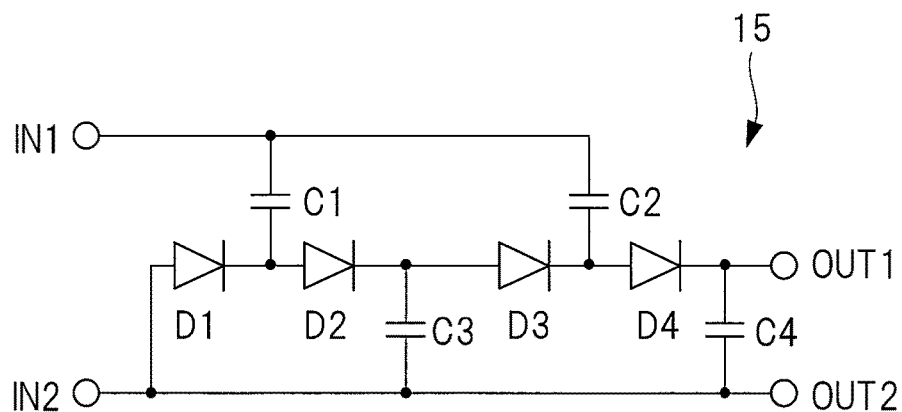
FIG. 3 is a diagram illustrating another circuit configuration example of a rectifier circuit provided in the communication visualization device of FIG. 1.

The rectifier circuit 15 illustrated in FIG. 3 includes capacitors C1 to C4 for DC-cutting and diodes D1 to D4 each including a Schottky barrier diode.

One ends of the capacitors C1 and C2 are connected to one input part IN1 of the rectifier circuit 15. The other input part IN2 of the rectifier circuit 15 and the outer output part OUT2 of the rectifier circuit 15 are connected to an anode of the diode D1 and the other ends of the capacitors C3 and C4.

Output parts of the matching circuit 14 in FIG. 1 are respectively connected to the input parts IN1 and IN2 of the rectifier circuit 15. An anode of the diode D2 and one end of the capacitor C1 are connected to a cathode of the diode D1. An anode of the diode D3 and the other end of the capacitor C3 are connected to a cathode of the diode D2. An anode of the diode D4 and the other end of the capacitor C2 are connected to a cathode of the diode D3.

One end of the capacitor C4 is connected to a cathode of the diode D4. A connection portion between the cathode of the diode D4 and one end of the capacitor C4 becomes the output part OUT1 of the rectifier circuit 15. The output parts OUT1 and OUT2 of the rectifier circuit 15 are connected to the light-emitting circuit 16. The DC voltage is output from the output parts OUT1 and OUT2 of the rectifier circuit 15.

Figure 4:
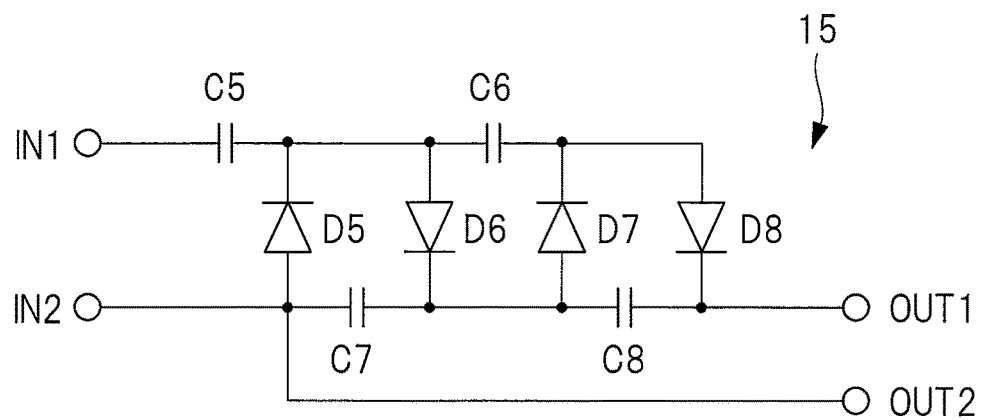
FIG. 4 is a diagram illustrating another circuit configuration example of a rectifier circuit provided in the communication visualization device of FIG. 1.

The rectifier circuit 15 illustrated in FIG. 4 includes capacitors C5 to C8 for DC-cutting and diodes D5 to D8 each including a Schottky barrier diode. One input part IN1 of the rectifier circuit 15 is connected to one end of the capacitor C5. The other input part IN2 of the rectifier circuit 15 is connected to an anode of the diode D5 and one end of the capacitor C7.

The output parts of the matching circuit 14 are respectively connected to the input parts IN1 and IN2 of the rectifier circuit 15. A cathode of the diode D5, an anode of the diode D6, and the other end of the capacitor C6 are connected to the other end of the capacitor C5. A cathode of the diode D6, an anode of the diode D7, and one end of the capacitor C8 are connected to the other end of the capacitor C7.

A cathode of the diode D7 and an anode of the diode D8 are connected to the other end of the capacitor C6. The other end of the capacitor C8 is connected to a cathode of the diode D8.

A connection portion between the diode D5 and the capacitor C7 becomes one output part OUT2 of the rectifier circuit 15, and a connection portion between the diode D8 and the capacitor C8 becomes the other output part OUT1 of the rectifier circuit 15. The DC voltage is output from the output parts OUT1 and OUT2 of the rectifier circuit 15.

Figure 5:
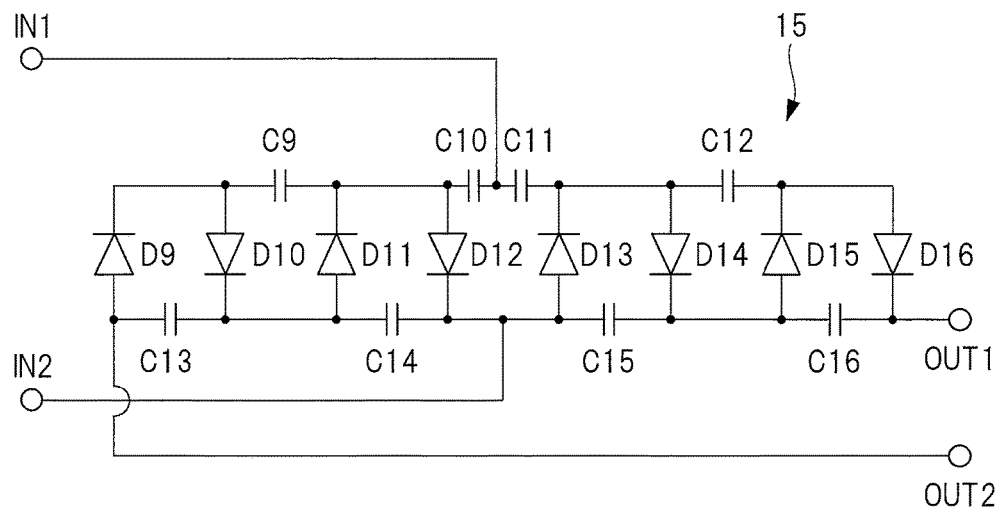
FIG. 5 is a diagram illustrating another circuit configuration example of a rectifier circuit provided in the communication visualization device of FIG. 1.

The rectifier circuit 15 illustrated in FIG. 5 includes capacitors C9 to C16 for DC-cutting and diodes D9 to D16 each including a Schottky barrier diode. One ends of the capacitors C10 and C11 are connected to one input part IN1 of the rectifier circuit 15. A cathode of the diode D12, an anode of the diode D13, and one ends of the capacitors C14 and C15 are connected to the other input part IN2 of the rectifier circuit 15.

The output parts of the matching circuit 14 are respectively connected to the input parts IN1 and IN2 of the rectifier circuit 15. A cathode of the diode D11, an anode of the diode D12, and one end of the capacitor C9 are connected to the other end of the capacitor C10. An anode of the diode D10 and a cathode of the diode D9 are connected to the other end of the capacitor C9.

One end of the capacitor C13 is connected to an anode of the diode D9. A cathode of the diode D10, an anode of the diode D11, and the other end of the capacitor C14 are connected to the other end of the capacitor C13.

A cathode of the diode D13, an anode of the diode D14, and one end of the capacitor C12 are connected to the other end of the capacitor C11. A cathode of the diode D15 and an anode of the diode D16 are connected to the other end of the capacitor C12.

A cathode of the diode D14, an anode of the diode D15, and one end of the capacitor C16 are connected to the other end of the capacitor C15. A cathode of the diode D16 is connected to the other end of the capacitor C16.

A connection portion between the capacitor C16 and the diode D16 becomes one output part OUT1 of the rectifier circuit 15, and a connection portion between the diode D9 and the capacitor C13 becomes the other output part OUT2 of the rectifier circuit 15. The DC voltage is output from the output parts OUT1 and OUT2 of the rectifier circuit 15. The output parts OUT1 and OUT2 of the rectifier circuit 15 are connected to the light-emitting circuit 16 in FIG. 1 and the DC voltage is output from the output parts OUT1 and OUT2 of the rectifier circuit 15.

Figure 6:
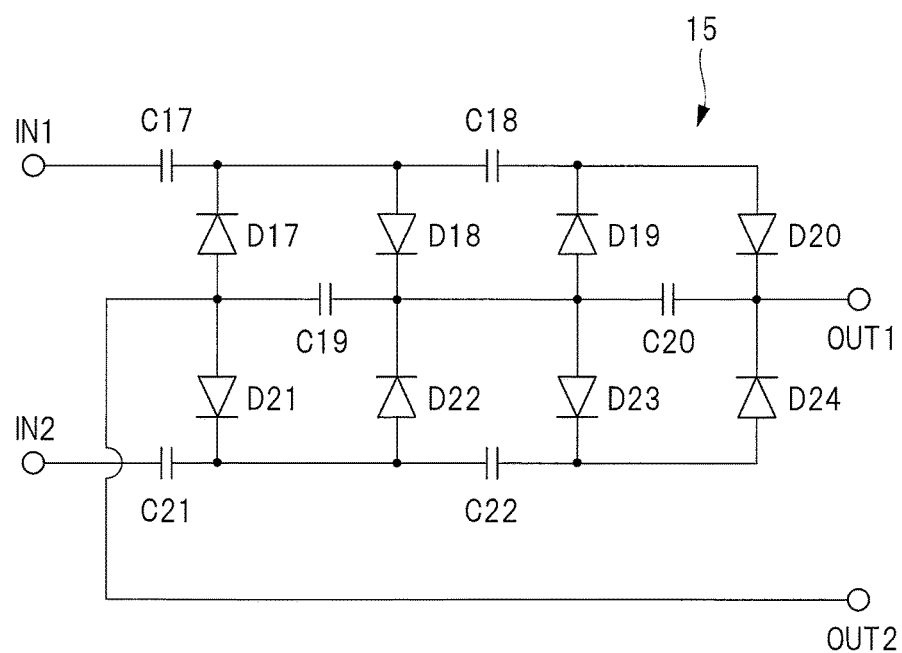
FIG. 6 is a diagram illustrating another circuit configuration example of a rectifier circuit provided in the communication visualization device of FIG. 1.

The rectifier circuit 15 illustrated in FIG. 6 includes capacitors C17 to C22 for DC-cutting and diodes D17 to D24 each including a Schottky barrier diode.

One end of the capacitor C17 is connected to one input part IN1 of the rectifier circuit 15, and one end of the capacitor C21 is connected to the other input part IN2 of the rectifier circuit 15. The output parts of the amplifier circuit 13 are respectively connected to the input parts IN1 and IN2 of the rectifier circuit 15.

A cathode of the diode D17, an anode of the diode D18, and the other end of the capacitor C18 are connected to one end of the capacitor C17. A cathode of the diode D19 and an anode of the diode D20 are connected to the other end of the capacitor C18.

A cathode of the diode D21, an anode of the diode D22, and one end of the capacitor C22 are connected to the other end of the capacitor C21. An anode of the diode D21 and one end of the capacitor C19 are connected to an anode of the diode D17.

One end of the capacitor C20, cathodes of the diodes D18 and D22, and anodes of the diodes D19 and D23 are connected to the other end of the capacitor C19. Cathodes of the diodes D20 and D24 are connected to the other end of the capacitor C20. A cathode of the diode D23 and an anode of the diode D24 are connected to the other end of the capacitor C22.

A connection portion between the capacitor C20 and the diodes D20 and D24 becomes one output part OUT1 of the rectifier circuit 15, and a connection portion between the capacitor C19 and the diodes D17 and D21 becomes the other output part OUT2 of the rectifier circuit 15. The DC voltage is output from the output parts OUT1 and OUT2 of the rectifier circuit 15.

The rectifier circuit 15 respectively illustrated in FIGS. 3 to 5 is configured by, for example, a double voltage half-wave rectification circuit and the rectifier circuit 15 illustrated in FIG. 5 is configured by, for example, a double voltage full-wave rectification circuit.

Configuration Example of Light-Emitting Circuit

Next, the light-emitting circuit 16 will be described.

Figure 7:
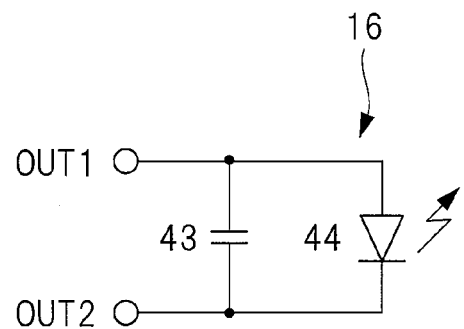
FIG. 7 is a diagram illustrating a circuit example of a light-emitting circuit provided in the communication visualization device of FIG. 1.

FIG. 7 is a diagram illustrating a circuit example of the light-emitting circuit 16 provided in the communication visualization device 10 of FIG. 1.

As illustrated in FIG. 7, the light-emitting circuit 16 includes a capacitor 43 for high-frequency removal and a light-emitting diode (LED) 44. The output part OUT1 of the rectifier circuit 15 is connected to one end of the capacitor 43 and an anode of the light-emitting diode 44. The output part OUT2 of the rectifier circuit 15 is connected to the other end of the capacitor 43 and a cathode of the light-emitting diode 44.

The light-emitting diode 44 emits light with the DC voltage supplied from the rectifier circuit 15. In addition, a high-frequency component output from the rectifier circuit 15 is removed by the capacitor 43. Thus, the DC voltage from which the high-frequency component, that is, a noise component, is removed is applied to the light-emitting diode 44, resulting in stabilization of light emission in the light-emitting diode 44.

Another Configuration Example 1 of Light-Emitting Circuit

Figure 8:
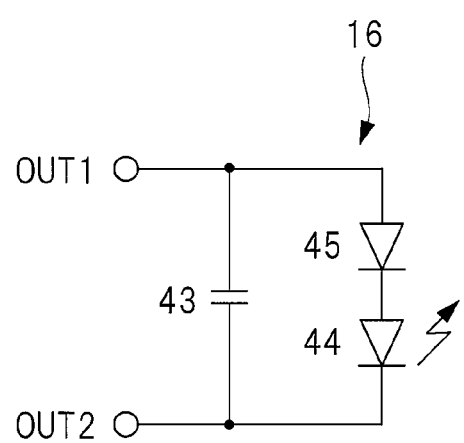
FIG. 8 is a diagram illustrating another configuration example of the light-emitting circuit of FIG. 7.

FIG. 8 is a diagram illustrating another configuration example of the light-emitting circuit 16 of FIG. 7.

Since the DC voltage supplied from the rectifier circuit 15 is a signal amplified by the amplifier circuit 13, there is a case where the supplied DC voltage is not stabilized due to a variation in a voltage level of the LAN cable 80, or the like.

In FIG. 8, there is provided a circuit configuration which stably emits light although a fluctuation in the DC voltage output from the rectifier circuit 15 occurs.

The light-emitting circuit 16 illustrated in FIG. 8 further includes a current regulative diode (CRD) 45 in addition to the capacitor 43 and the light-emitting diode 44 which are illustrated in FIG. 7.

The output part OUT1 of the rectifier circuit 15 is connected to an anode of the current regulative diode 45, and an anode of the light-emitting diode 44 is connected to a cathode of the current regulative diode 45.

The output part OUT2 of the rectifier circuit 15 is connected to a cathode of the light-emitting diode 44. Similarly to FIG. 7, the capacitor 43 is connected between the output parts OUT1 and OUT2 of the rectifier circuit 15.

The current regulative diode 45 operates such that an almost constant current flows although a fluctuation in the DC voltage supplied by the rectifier circuit 15 occurs. Accordingly, although a fluctuation in the DC voltage output from the rectifier circuit 15 occurs, it is possible to stabilize light emission in the light-emitting diode 44.

Another Configuration Example 2 of Light-Emitting Circuit

Figure 9:
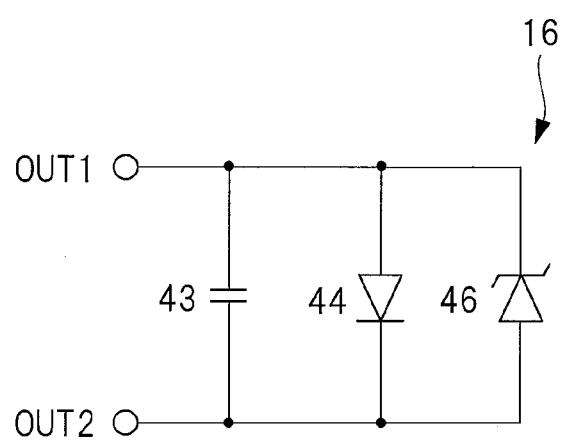
FIG. 9 is a diagram illustrating another configuration example of the light-emitting circuit of FIG. 7.

FIG. 9 is a diagram illustrating another configuration example of the light-emitting circuit 16 of FIG. 7.

The light-emitting circuit 16 illustrated in FIG. 9 further includes a zener diode 46 in addition to the capacitor 43 and the light-emitting diode 44 which are illustrated in FIG. 6. The output part OUT1 of the rectifier circuit 15 is connected to a cathode of the zener diode 46, and the output part OUT2 of the rectifier circuit 15 is connected to an anode of the zener diode 46. Since a connection configuration between the capacitor 43 and the light-emitting diode 44 is similar to that described with reference to FIG. 7, a description thereof will be omitted.

When the DC voltage output from the rectifier circuit 15 becomes larger than a zener voltage, the zener diode 46 allows a current to flow in the reverse direction, stabilizing the DC voltage output from the rectifier circuit 15. Therefore, it is possible to practically stabilize light emission in the light-emitting diode 44.

Another Configuration Example 3 of Light-Emitting Circuit

Figure 10:
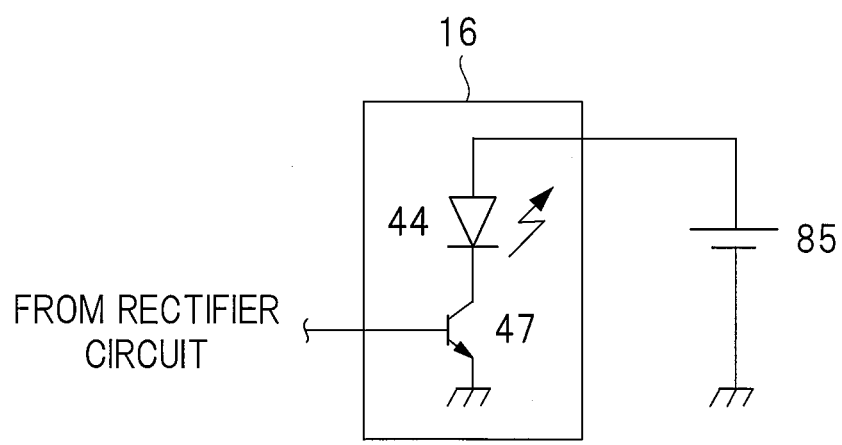
FIG. 10 is a diagram illustrating another configuration example of the light-emitting circuit of FIG. 7.

FIG. 10 is a diagram illustrating another configuration example of the light-emitting circuit 16 of FIG. 7.

Although the rectifier circuit 15 is provided in the preceding stage of the light-emitting circuit 16 in the cases of the light-emitting circuits 16 illustrated in FIGS. 7 to 9, the rectifier circuit 15 can be unnecessary in the case of the light-emitting circuit 16 illustrated in FIG. 10.

The light-emitting circuit 16 illustrated in FIG. 10 includes a light-emitting diode 44 and a transistor 47 that is of, for example, a bipolar-type. A collector of the transistor 47 is connected to a cathode of the light-emitting diode 44. Operation power output from an external power supply device 85 which supplies operation power to the amplifier circuit 13 illustrated in FIG. 1 is supplied to an anode of the light-emitting diode 44 and an emitter of the transistor 47. In addition, a signal output from the matching circuit 14 of FIG. 1 is input to a base of the transistor 47.

When the base of the transistor 47 is at a Hi level, the transistor 47 is turned on, and the light-emitting diode 44 emits light. By appropriately setting a threshold voltage of the transistor 47, stable light emission operation can be achieved even when a DC voltage input from the rectifier circuit 15 is unstable.

In addition, a DC voltage rectified by the rectifier circuit 15 may be supplied to the anode of the light-emitting diode 44, not a DC voltage generated by the external power supply device 85.

Configuration Example of Transformer

Figure 11:
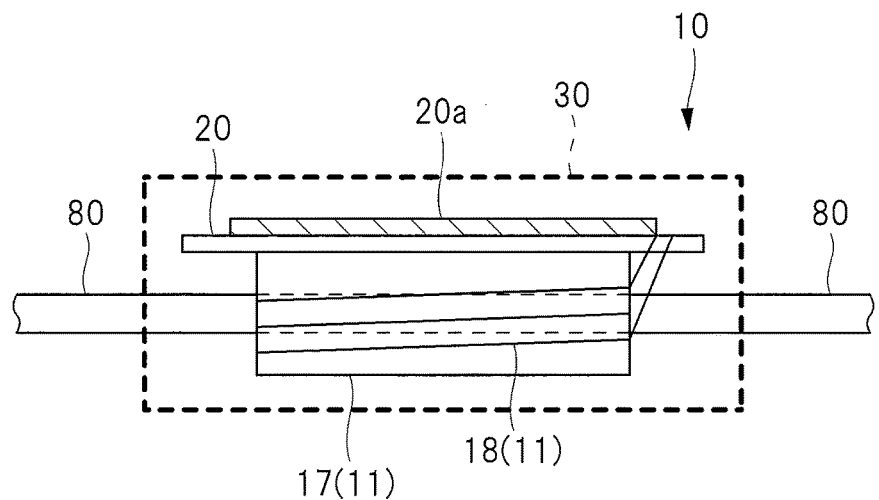
FIG. 11 is a diagram illustrating an example in which the communication visualization device of FIG. 1 is attached to a LAN cable.

FIG. 11 is a diagram illustrating an example in which the communication visualization device 10 of FIG. 1 is attached to a LAN cable 80.

As illustrated in FIG. 11, the transformer 11 includes a ferrite core 17 and a coil 18. The ferrite core 17 is made by forming a ceramic magnetic material, called ferrite, in a hollow cylindrical shape, that is, a ring shape. The coil 18 is wound on a ring of the ferrite core 17.

The ferrite core 17 is mounted to be adhered to a rear surface of the printed wiring board 20 by adhesive, such as epoxy resin. Ends of the coil 18 are electrically connected respectively to lands (not illustrated) formed in the printed wiring board 20 by soldering or the like. The coil 18 is connected to an input part of the matching circuit 12 via the lands and a through hole, a wiring pattern, or the like formed in the printed wiring board 20.

Mounting Example of Communication Visualization Device

As illustrated in FIG. 11, a matching circuit 12, an amplifier circuit 13, a matching circuit 14, a rectifier circuit 15, and a light-emitting circuit 16 are mounted on a circuit-mounting region 20a (region indicated by hatching in FIG. 11) in a principal surface of the printed wiring board 20.

For example, the power supply connector 20d illustrated in FIG. 1 is mounted on the area the circuit-mounting region 20a of the printed wiring board 20. An electrode part of the power supply connector 20d is connected to the amplifier circuit 13 through a wiring pattern (not illustrated) of the printed wiring board 20.

The power supply connector 20d is connected to the power supply plug 85a of FIG. 1, which is included in the external power supply device 85. Therefore, power from the external power supply device 85 is supplied as the operation power of the amplifier circuit 13.

A case 30 is formed of, for example, synthetic resin, such as plastic, and has a hollow rectangular shape. The printed wiring board 20 mounted with the communication visualization device 10 is accommodated in a hollow portion of the case 30. The LAN cable 80 passes through a concentric hole of the ferrite core 17. The LAN cable 80 is a communication cable used for Ethernet LAN or the like. Ethernet is a registered trademark.

The case 30 is formed of, for example, colorless transparent plastic and the like. Since the case 30 is formed of colorless transparent plastic, it is possible to check light emission at a glance when the light-emitting diode 44 of the light-emitting circuit 16 emits light.

Furthermore, since it is required only that the light emission of the light-emitting diode 44 is easily checked, there is no necessity that the case 30 is colorless, and the case 30 may be colored and transparent. Alternatively, a light emission checking window which is formed of, for example, a colorless transparent plastic cover, may be formed in a partial region of the case 30. Even in this case, it is possible to check light emission at a glance when the light-emitting diode 44 emits light.

The case 30 may be installed integrally with the LAN cable 80 as illustrated in FIG. 11, or may be installed removably from, for example, the LAN cable 80.

In this case, the case 30 includes two case blocks and a hinge is provided in one major side of the case block. Due to this, two case blocks are opened or closed around the hinge. In addition, clampers which clamp the two case blocks are formed in the other major sides of the case blocks.

Similarly, the ferrite core 17 is divided into two semi-cylindrical parts, and one semi cylindrical ferrite core is mounted on the printed wiring board 20.

The printed wiring board 20 is accommodated in a hollow portion of one case block and the other semi-cylindrical ferrite core is accommodated in a hollow portion of the other case block. In the case of installing the case in the LAN cable 80, in a state in which the two case block are opened, the LAN cable 80 is accommodated in, for example, a groove portion of one semi-cylindrical ferrite core. Thereafter, the two case blocks are closed and the case blocks are clamped by the clampers. Therefore, it is possible to install the communication visualization device 10 at an arbitrary position in the LAN cable 80.

Operation Example of Communication Visualization Device

Next, an operation of the communication visualization device 10 will be described.

When information communication is initiated through the LAN cable 80, the communication causes a magnetic field inside the ferrite core 17 of the transformer 11. As a result, a current flows through the coil 18 and a voltage induced by the current is caused. Therefore, an AC electric signal is output from the coil 18. The AC electric signal generated by the transformer 11 is output to the amplifier circuit 13 through the matching circuit 12. The matching circuit 12 allows impedance matching between the transformer 11 and the amplifier circuit 13 to be optimized. Therefore, it is possible to reduce power loss.

The amplifier circuit 13 amplifies and outputs a differential signal which is an input communication signal. As described above, operation power generated by the external power supply device 85, which is external power, is supplied to the amplifier circuit 13. To this end, it is possible to achieve stable operation of the communication visualization device 10 without generating power used by the light-emitting diode 44 for light emission from an electric signal generated by the transformer 11.

The electric signal which is amplified by the amplifier circuit 13 is input to the rectifier circuit 15 through the matching circuit 14. Due to the matching circuit 14, the impedance matching between the amplifier circuit 13 and the rectifier circuit 15 is optimized, leading to reduction in power loss.

The rectifier circuit 15 performs double voltage half-wave rectification, double voltage full-wave rectification, or the like on the electric signal amplified by the amplifier circuit 13 and generates a DC voltage to output the DC voltage to the light-emitting circuit 16. The light-emitting diode 44 included in the light-emitting circuit 16 emits light by supplying power to the light-emitting circuit 16 from the rectifier circuit 15. In a case where information communication of the LAN cable 80 is not performed, the differential signal is not input to the communication visualization device 10. Therefore, the light-emitting diode 44 does not emit light.

As a result, the communication visualization device 10 allows the light-emitting diode 44 to emit light only when the LAN cable 80 performs information communication at the time of information communication. Since the case 30 is colorless and transparent, it is possible to check light emission at a glance when the light-emitting diode 44 emits light.

Since power generated by the transformer 11 is used as a driving power of the light-emitting diode 44, it is possible to suppress degradation of signal quality in the LAN cable 80.

Thereby, it is possible to visually determine whether the LAN cable 80 is in an information communication state and improve quality of information communication.

In addition, since an existing LAN cable can be used, it is possible to easily perform work, such as extension or replacement of the LAN cable, in a short time, without requiring special work or the like.

Second Embodiment

Overview

In a data center or the like, in order to facilitate change or extension of a LAN cable wiring, extension of a LAN cable, or the like and therefore, improve maintainability, an extension adapter which connects two LAN cables, or a wiring panel, that is, a so-called patch panel which concentrates and connects a plurality of LAN cables has been widely used. Therefore, in the present a second embodiment, a technology of installing the communication visualization device 10 in the extension adapter and the patch panel will be described.

<Configuration of Extension Adapter>

Figure 12:
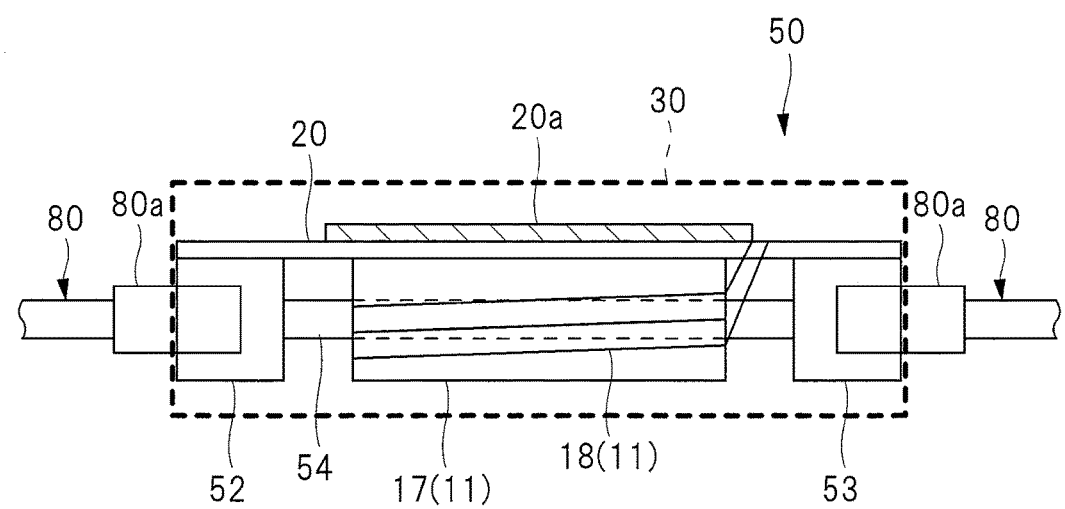
FIG. 12 is a diagram illustrating a configuration example of an extension adapter including a communication visualization device according to a second embodiment.

FIG. 12 is a diagram illustrating a configuration example of an extension adapter 50 including the communication visualization device 10, according to the present second embodiment.

The extension adapter 50 is an adapter which connects two LAN cables 80 to achieve extension, and facilitates extension of a LAN cable or the like in a data center or the like. The extension adapter 50 is configured such that jack connectors 52 and 53 are additionally provided in the configuration of FIG. 11 according to the first embodiment.

Similarly to FIG. 11, a matching circuit 12, an amplifier circuit 13, a matching circuit 14, a rectifier circuit 15, and a light-emitting circuit 16 are mounted on a circuit-mounting region 20a (region indicated by hatching in FIG. 12) in a principal surface of the printed wiring board 20 having a rectangular shape.

A power supply connector (not illustrated) is mounted on the circuit-mounting region 20a of the printed wiring board 20. An electrode part of the power supply connector is connected to the amplifier circuit 13 through a wiring pattern (not illustrated) of the printed wiring board 20. The power supply connector is connected to the external power supply device 85, and a power supply plug (not illustrated) is connected to the external power supply device 85. Therefore, power from the external power supply device 85 is supplied as the operation power of the amplifier circuit 13.

In addition, the jack connectors 52 and 53 and the transformer 11 are mounted on a rear surface of the printed wiring board 20. The jack connectors 52 and 53 are mounted respectively on two opposing minor sides of the rear surface of the printed wiring board 20. The jack connectors 52 and 53 are connectors connected to the plug connector 80a included in the LAN cable 80. The jack connector 52 is connected to the jack connector 53 by the cable 54. The cable 54 is configured similarly to the LAN cable 80.

The transformer 11 is mounted between the jack connector 52 and the jack connector 53 in the rear surface of the printed wiring board 20. Similarly to FIG. 11, the transformer 11 includes a ferrite core 17 and a coil 18.

Ends of the coil 18 are electrically connected respectively to lands (not illustrated) formed in the printed wiring board 20 by soldering or the like. The coil 18 is connected to an input part of the matching circuit 12 via a through hole, a wiring pattern, or the like formed in the lands and the printed wiring board 20.

The ferrite core 17 is adhered to the rear surface of the printed wiring board 20 by adhesive, such as epoxy resin. The cable 54 passes through a concentric hole of the ferrite core 17.

Similarly to FIG. 11, the printed wiring board 20, on which the communication visualization device 10, the jack connectors 52, and 53, and the like are mounted, is accommodated in a hollow portion of the case 30 including a hollow rectangular body and the like. Therefore, the extension adapter 50 is formed.

The case 30 is formed of synthetic resin, for example, colorless transparent plastic or the like. Since the case 30 is formed of colorless transparent plastic, it is possible to check light emission at a glance when the light-emitting diode 44 of the light-emitting circuit 16 emits light.

In addition, since it is required only that the light emission of the light-emitting diode 44 is easily checked, for example, a region of apart of the case 30 only may be colorless and transparent, thereby allowing light emission to be checked through the region.

Therefore, the communication visualization device 10 is incorporated in the extension adapter 50, leading to non-requirement of a dedicated LAN cable or the like. Accordingly, it is possible to reduce cost.

In addition, since an existing LAN cable can be used, it is possible to visually determine whether the LAN cable 80 is in an information communication state, only by connecting the LAN cable to the extension adapter 50. Accordingly, it is possible to easily perform work, such as extension or replacement of the LAN cable, in a short time, without requiring special work or the like.

Similarly to the first embodiment, it is possible to visually determine whether the LAN cable 80 is in an information communication state and improve quality of information communication. Moreover, a target LAN cable can be easily checked among LAN cables 80 connected to a plurality of extension adapters 50, preventing the LAN cable 80 from being incorrectly removed, or the like.

Configuration Example of Patch Panel

Figure 13:
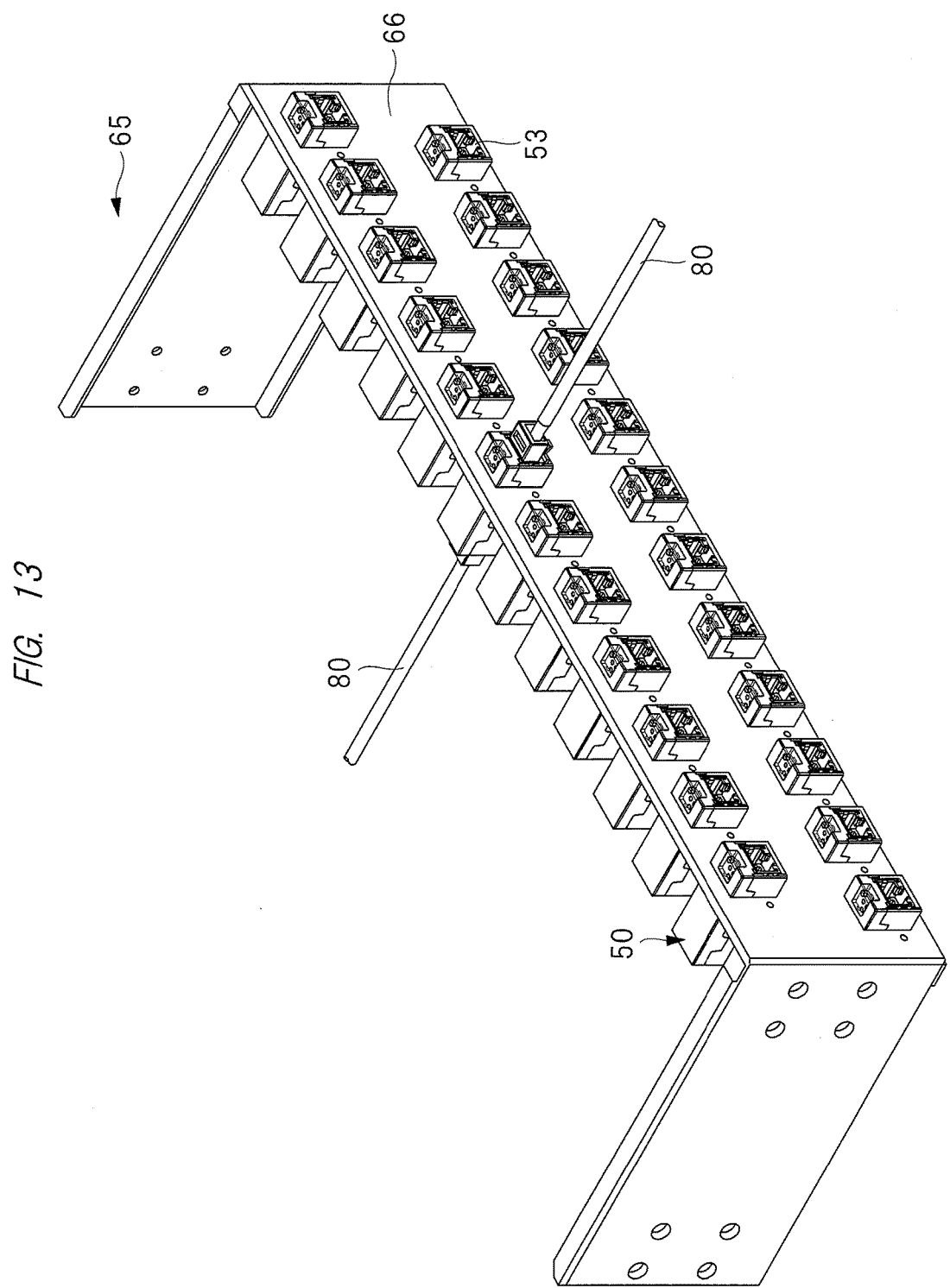
FIG. 13 is a diagram illustrating an example of a patch panel configured by using the extension adapter of FIG. 12.

FIG. 13 is a diagram illustrating an example of a patch panel 65 configured by using the extension adapter 50 of FIG. 12.

The patch panel 65 is a wiring panel which concentrates LAN cables in, for example, a data center, in order to facilitate change or extension of a LAN cable wiring or the like and therefore, improve maintainability.

As illustrated in FIG. 13, the patch panel 65 has a configuration in which a plurality of extension adapters 50 illustrated in FIG. 12 are arranged in, for example, two upper and lower rows on a front panel 66. Although 12 extension adapters 50 are illustrated as being arranged in each row in FIG. 13, the number of the extension adapters 50 and the number of arrangement rows are especially not limited.

By the above configuration, it is possible to visually determine whether the LAN cable 80 connected to the patch panel 65 is in an information communication state.

Therefore, when a wiring of the LAN cables 80 is changed, it is possible to easily check a removal target LAN cable among a plurality of LAN cables 80 connected to the patch panel 65, resulting in improvement of workability upon change in the wiring or the like. In addition, it is possible to improve quality of information communication.

Furthermore, the communication visualization device 10 is incorporated in the extension adapter 50 installed in the patch panel 65, leading to non-requirement of a dedicated LAN cable and reduction in cost.

Moreover, although the communication visualization device 10 is illustrated as being mounted on each printed wiring board 20 in FIG. 13, a plurality of communication visualization devices 10 may be mounted on one printed wiring board. For example, there may be provided a configuration in which the communication visualization device 10 and the jack connectors 52 and 53, which constitute the extension adapter 50 in the upper row, and the communication visualization device 10 and the jack connectors 52 and 53, which constitute the extension adapter 50 in the lower row are mounted on one printed wiring board. Due to this configuration, the case 30 is not required and cost can be reduced.

Third Embodiment

Overview

In the second embodiment, an extension adapter is configured in such a way that the cable 54 is connected between the jack connector 52 and the jack connector 53 by wiring. In the present third embodiment, there is described a technology of constituting an extension adapter 50 with lower cost due to non-requirement of the cable 54.

Configuration Example of Extension Adapter

Figure 14:
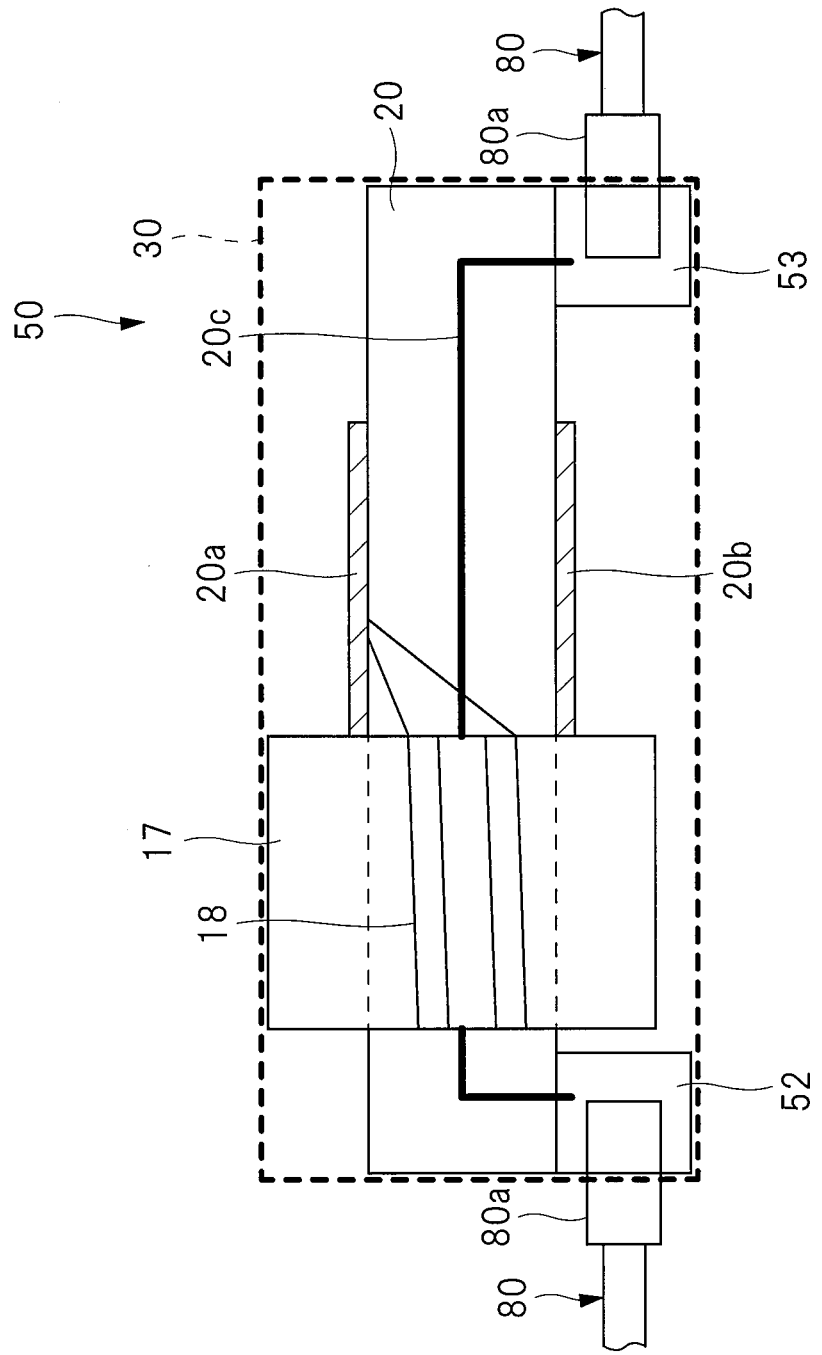
FIG. 14 is a diagram illustrating an example of an extension adapter in a front direction, which includes a communication visualization device according to a third embodiment.
Figure 15:
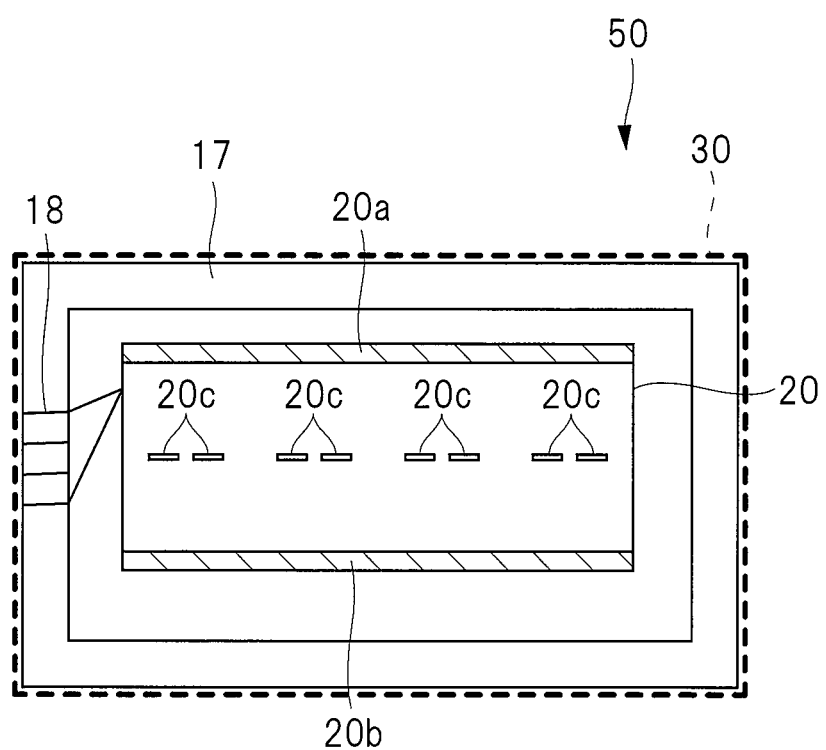
FIG. 15 is a diagram illustrating an example of the extension adapter of FIG. 14 in a side direction.

FIG. 14 is a diagram illustrating an example of an extension adapter 50 in a front direction, which includes the communication visualization device 10, according to the present third embodiment. FIG. 15 is a diagram illustrating an example of the extension adapter 50 of FIG. 14 in a side direction.

The extension adapter 50 illustrated in FIGS. 14 and 15 includes a rectangular printed wiring board 20. A principal surface of the printed wiring board 20 has a circuit-mounting region 20a (region indicated by hatching in FIGS. 14 and 15), and a rear surface of the printed wiring board 20 has a circuit-mounting region 20b (region indicated by hatching in FIGS. 14 and 15). The transformer 11, the amplifier circuit 13, the matching circuit 14, the rectifier circuit 15, and the light-emitting circuit 16 which constitute the communication visualization device 10 are mounted on the circuit-mounting regions 20a and 20b. A configuration of the communication visualization device 10 is similar to that of FIG. 12.

A power supply connector (not illustrated) is mounted on the circuit-mounting region 20a of the printed wiring board 20. An electrode part of the power supply connector is connected to the amplifier circuit 13 through a wiring pattern (not illustrated) of the printed wiring board 20. The power supply connector is connected to the external power supply device 85, and a power supply plug (not illustrated) is connected to the external power supply device 85. Therefore, power from the external power supply device 85 is supplied as the operation power of the amplifier circuit 13.

The jack connectors 52 and 53 are mounted respectively on two opposing minor sides in the rear surface of the printed wiring board 20. The ferrite core 17 constituting the transformer 11 is provided between the jack connector 52 and the circuit-mounting regions 20a and 20b of the printed wiring board 20.

The ferrite core 17 is generated by forming a ceramic magnetic material, called ferrite, in a hollow cylindrical shape, that is, a ring shape, and the coil 18 is wound on a ring of the ferrite core 17.

In addition, a concentric hole of the ferrite core 17 is installed such that the printed wiring board 20 passes therethrough. A plurality of wiring patterns 20c which connect the jack connector 52 and the jack connector 53 are formed in the printed wiring board 20.

The LAN cable 80 is a popular product used in Ethernet LAN or the like, and the LAN cable 80 includes cable lines containing eight copper wires and the like. Two cable lines form a fair and total four pairs are formed. Differential signals are transferred to cables of each pair. The eight cable lines of the LAN cable 80 are respectively connected to the wiring patterns 20c.

Ends of the coil 18 are electrically connected respectively to lands (not illustrated) or the like formed in the printed wiring board 20 by soldering or the like. The coil 18 is connected to an input part of the matching circuit 12 via a through hole, a wiring pattern, or the like formed in the lands and the printed wiring board 20. The ferrite core 17 generates a magnetic field by a communication signal flowing through the wiring pattern 20c of the printed wiring board 20 via the LAN cable 80 at the time of information communication.

Similarly to FIG. 12, the printed wiring board 20, on which the communication visualization device 10, the jack connectors 52 and 53, and the like are mounted, is accommodated in a hollow portion of the case 30 including a hollow rectangular body and the like. Therefore, the extension adapter 50 is formed.

Operation Example of Communication Visualization Device

When communication is initiated by an information communication apparatus and the LAN cable 80 transfers information communication, a relevant communication signal is transferred to the wiring pattern 20c of the printed wiring board 20 through the jack connector 52 or the jack connector 53.

Due to the communication, a magnetic field is caused inside the ferrite core 17 of the transformer 11. As a result, a current flows through the coil 18 and a voltage induced by the current is caused. Therefore, an AC electric signal is output from the coil 18. Since subsequent operation is similar to that of the first embodiment, a detailed description thereof will be omitted.

Therefore, the configuration illustrated in FIGS. 14 and 15 does not require the cable 54 illustrated in FIG. 12. In addition, a process of connecting the cable 54 to the jack connectors 52 and 53 or the like are not required. Accordingly, it is possible to reduce cost of the extension adapter 50. Furthermore, it is possible to obtain a functional effect similar to that of the aforementioned second embodiment.

In the foregoing, the invention made by the inventor of the present invention has been concretely described based on the embodiments. However, it goes without saying that the present invention is not limited to the foregoing embodiments and various modifications and alterations can be made within the scope of the present invention.

Note that the present invention is not limited to the embodiments described above, but includes various modification examples. For example, the embodiments above have been described in detail so as to make the present invention easily understood, and the present invention is not limited to the embodiment having all of the described constituent elements.

Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

What is claimed is:

1. A communication visualization device comprising:
    a converting part for converting a magnetic field caused from a communication cable connected to an information communication apparatus into electric energy at time of information communication;
    an amplifying part for amplifying the electric energy output from the converting part;
    a rectifying part for converting an amplified signal amplified by the amplifying part into a DC voltage; and
    a light-emitting part for emitting light when the DC voltage obtained by conversion of the rectifying part is supplied thereto.

2. The communication visualization device according to claim 1,
    wherein the converting part comprises:
    a ferrite core for generating a magnetic field by communication of the communication cable; and
    a coil wound on the ferrite core to output a voltage induced by a current caused by the magnetic field which is generated by the ferrite core.

3. The communication visualization device according to claim 1,
    wherein the amplifying part operates with a power supply voltage supplied from the outside.

4. The communication visualization device according to claim 1, further comprising a first matching part for adjusting an impedance between the converting part and the amplifying part.

5. The communication visualization device according to claim 1, further comprising a second matching part for adjusting an impedance between the amplifying part and the rectifying part.

6. The communication visualization device according to claim 1,
    wherein the communication visualization device is attached to the communication cable.

7. The communication visualization device according to claim. 1,
    wherein the communication visualization device is installed in an extension adapter which connects the communication cable to achieve extension.

8. The communication visualization device according to claim 1,
    wherein the communication visualization device is installed in a wiring panel which concentrates a plurality of the communication cables.

* * * * *